(12) United States Patent
Grenzi et al.

(10) Patent No.: US 12,195,115 B2
(45) Date of Patent: Jan. 14, 2025

(54) TRACK LINK, METHOD OF MANUFACTURING THE SAME, AND TRACK ASSEMBLY

(71) Applicants: Berco S.p.A., Copparo/Ferrara (IT); thyssenkrupp AG, Essen (DE)

(72) Inventors: Francesco Grenzi, Ferrara (IT); Enrico Maggiolini, Ferrara (IT)

(73) Assignees: Berco S.p.A., Copparo/Ferrara (IT); thyssenkrupp AG, Essen (DE)

( * ) Notice: Subject to any disclaimer, the term of this patent is extended or adjusted under 35 U.S.C. 154(b) by 398 days.

(21) Appl. No.: 17/621,854

(22) PCT Filed: Jun. 25, 2020

(86) PCT No.: PCT/EP2020/067861
§ 371 (c)(1),
(2) Date: Dec. 22, 2021

(87) PCT Pub. No.: WO2020/260472
PCT Pub. Date: Dec. 30, 2020

(65) Prior Publication Data
US 2022/0258816 A1    Aug. 18, 2022

(30) Foreign Application Priority Data
Jun. 28, 2019 (EP) .................................... 19183262

(51) Int. Cl.
*B62D 55/21* (2006.01)
*B62D 55/28* (2006.01)
(52) U.S. Cl.
CPC ............. *B62D 55/21* (2013.01); *B62D 55/28* (2013.01)
(58) Field of Classification Search
CPC ........ B62D 55/21; B62D 55/26; B62D 55/28; B62D 55/32
See application file for complete search history.

(56) References Cited

U.S. PATENT DOCUMENTS 3,955,855 A * 5/1976 Massieon ............. B62D 55/202
305/192
4,449,357 A * 5/1984 Balitch .................. B62D 55/32
59/30

(Continued)

FOREIGN PATENT DOCUMENTS

CN    1417075 A    5/2003
CN    1572635 A    2/2005

(Continued)

OTHER PUBLICATIONS

European Search Report Issued in 19183262.5 dated Dec. 19, 2019.
English Translation of International Search Report issued in PCT/EP2020/067861, dated Oct. 26, 2020.

*Primary Examiner* — S. Joseph Morano
*Assistant Examiner* — Emily G. Castonguay
(74) *Attorney, Agent, or Firm* — thyssenkrupp North America, LLC

(57) ABSTRACT

A track link is fixable to a track shoe with nuts and bolts. The track link comprises connecting holes that are spaced in a link pitch direction and receive connection members, first and second through holes that extend orthogonally to the connecting holes and receive bolts, a first surface in which the first through hole opens and on which a first nut is positionable, a second surface in which the second through hole opens and on which a second nut is positionable, first projecting portions that project from the first surface and face each other across the first through hole, and second projecting portions that project from the second surface and face each other across the second through hole. Only one of the first projecting portions engages the first nut. At least one of the second projecting portions engages the second nut that is positionable between the second projecting portions.

17 Claims, 5 Drawing Sheets

(56) References Cited

U.S. PATENT DOCUMENTS

| | | | |
|---|---|---|---|
| 6,220,378 B1 | 4/2001 | Oertley et al. | |
| 2003/0090151 A1 | 5/2003 | Takeno et al. | |
| 2005/0088042 A1 | 4/2005 | Hisamatsu | |
| 2006/0043791 A1* | 3/2006 | Sho | B62D 55/20 305/198 |
| 2008/0164756 A1 | 7/2008 | Yamamoto et al. | |
| 2009/0026836 A1 | 1/2009 | Maeda | |
| 2009/0230763 A1 | 9/2009 | Sakai et al. | |
| 2009/0278402 A1 | 11/2009 | Busley | |
| 2012/0153715 A1 | 6/2012 | Tsubaki et al. | |
| 2014/0083782 A1* | 3/2014 | Brewer | B62D 55/202 180/9.1 |
| 2014/0152086 A1 | 6/2014 | Meyer et al. | |
| 2014/0292068 A1* | 10/2014 | Hisamatsu | B62D 55/21 305/202 |
| 2016/0068206 A1 | 3/2016 | Tsubaki et al. | |
| 2017/0043820 A1 | 2/2017 | Brooks et al. | |
| 2018/0050385 A1 | 2/2018 | Wang et al. | |

FOREIGN PATENT DOCUMENTS

| | | |
|---|---|---|
| CN | 102481960 A | 5/2012 |
| CN | 107406110 A | 11/2017 |
| CN | 107848587 A | 3/2018 |
| JP | S50 40001 U | 4/1975 |
| JP | S53 49842 U | 4/1978 |
| JP | 2005 119365 A | 5/2005 |
| JP | 2008018758 A | 1/2008 |
| KR | 10-2004-108560 A | 12/2004 |
| WO | 99/35024 A1 | 7/1999 |
| WO | 2017-027173 A1 | 2/2017 |

* cited by examiner

TRACK LINK, METHOD OF MANUFACTURING THE SAME, AND TRACK ASSEMBLY

CROSS REFERENCE TO RELATED APPLICATIONS

This application is a U.S. National Stage Entry of International Patent Application Serial Number PCT/EP2020/067861, filed Jun. 25, 2020, which claims priority to European Patent Application No. EP 19183262.5, filed Jun. 28, 2019, the entire contents of both of which are incorporated herein by reference.

FIELD

The present disclosure generally relates to tracked vehicles, including track links for track assemblies, to methods for manufacturing track links, and to track assemblies.

BACKGROUND

A tracked vehicle may include track assemblies on both of the left and right sides thereof, and allows the movement of the vehicle even on rough terrain. In general, each track assembly may include a number of track links that are fixed to track shoes of the track assembly. The adjacent links are connected to one another with link connecting members such as pins and bushings to form the chain into an endless or closed track. A sprocket wheel, which is provided at one end of the endless track and driven by power source, successively engages with the link connecting member and circulates the track assembly. An idler wheel is provided at the other end of the endless track and spaced from the sprocket wheel. A plurality of pulleys may be arranged between the sprocket wheel and the idler wheel to guide the circulation of the endless track.

Each link may be fixed to the track shoe in different ways depending on the size of the link, for example. In one way, relatively small track links may be fixed to the track shoe by welding. In another way, relatively large track links may be secured to the shoe with bolts and nuts. In this case, each track link may be fixed to each shoe with two or more sets of bolt and nut.

US 2018/0050385 A1 is directed to a track link to which a track shoe is mounted with fastening nuts and bolts. Detents are formed on a seat surface on which the nut seats to prevent a rotation of the nut. Particularly, two stepped parts are provided to form the detents. The two stepped parts are provided on both sides of a through hole within which the bolt is placed. When a rotating torque is applied to the nut, the nut is prevented from rotating by the engagement between the two stepped parts and the nut. In such a link in which the two detents engage with the nut on its both sides, the through hole within which the shoe bolt is placed must be formed in an exact middle position of the two detents.

US 2005/088042 A1, US 2009/230763 A1 and WO 99/35024 A1 also disclose a similar structure.

Sometimes there are different products with almost the same design; just a small detail could define more products from the same starting concept. This phenomenon generates a waste of time in the production plan and requires more space in warehouses. Standardization is the key to avoid the situation mentioned above and find a common line in the design of different products.

The conventional track link discussed above, however, are not suitable for the standardization since the position of the through hole for receiving the shoe bolt should be at the exact middle position of the two detents and cannot be changed. For this reason, different kinds of track link materials or semi-finished track links must be prepared separately so as to match with each of the track shoes having different through hole pitches or pattern, resulting in a complicated manufacturing process and requiring more space in warehouses.

Thus a need exists for a track link that is connectable to different types of track shoes and thus allows for a cost efficient manufacturing process. A need also exists for a track assembly and method of manufacturing a track link.

SUMMARY

Specifically, the disclosure may provide a track link. The track link is configured to be fixed to a track shoe with bolts and nuts. The track link may include two connecting holes, a first through hole, a first surface, a second through hole, a second surface, first projecting portions as a pair, and second projecting portions as a pair. The two connecting holes may be spaced from each other by a predetermined distance in a link pitch direction and be configured to receive a link connection member respectively. The first through hole may extend orthogonal to the connecting holes and be configured to receive one of the bolts. The first through hole may open to the first surface. One of the nuts may be placed on the first surface. The second through hole may extend orthogonal to the connecting hole and be configured to receive another bolt. The second through hole may open to the second surface. Another nut may be placed on the second surface. The first projecting portions may project from the first surface and face each other in the link pitch direction across the first through hole. The second projecting portions may project from the second surface and face each other in the link pitch direction across the second through hole. The first projecting portions may be spaced apart from each other by a first distance through which one of the first projecting portions engages with the nut that is to be placed between the first projecting portions but the other of the first projecting portions does not. The second projecting portions may be spaced apart from each other by a second distance through which one of the second projecting portions engages with the nut that is to be placed between the second projecting portions but the other of the second projecting portions does not, or both of the second projecting portions engage with the nut.

The invention allows for a high standardization as the distance of the first projecting portions provide space for drilling the first through hole in different position wherein a nut, which engages a bolt that is placed through the first through hole, still is blocked from rotating as it contacts at least one of the first projections. Therefore, the inventive track link can be used for manufacturing different track assemblies. Only in the last step of producing the track link, a decision has to be made whether the track link is used for a track for a specific customer.

In a preferred arrangement, the first through hole may be circular in a cross section, and may have a center shifted from a middle position of the first projecting portions in the link pitch direction.

In an alternative, the first through hole may have an oval shape in a cross section.

In a preferred arrangement, the track link may further include a first opening between the two connecting holes. An inner wall surface of the first opening may define the first surface and the first projecting portions.

In a preferred arrangement, the second through hole may be circular in a cross section, and have a center shifted from a middle position of the second projecting portions in the link pitch direction.

In an alternative, the second through hole may have an oval shape in a cross section.

In a preferred arrangement, the track link may further include a second opening between the two connecting holes. An inner wall surface of the second opening may define the second surface and the second projecting portions.

In a preferred arrangement, the first distance may be greater than a width of the nut which is to be placed between the first projecting portions.

In a preferred arrangement, the second distance is greater than a width of the nut which is to be placed between the second projecting portions.

The disclosure may further provide a track assembly. The track assembly may include a plurality of track links, each according to the above mentioned aspect, link connection members for connecting the plurality of links, track shoes each having through holes, bolts which are placed within the through holes of the track shoe and the first and second through holes of the track link, and nuts each fastened to an end of the bolt. The nut disposed between the first projecting portions may engage with one of the first projecting portions but does not with the other of the first projecting portions. The nut disposed between the second projecting portions may engage with one of the second projecting portions but does not with the other of the second projecting portions, or engage with both of the second projecting portions.

The disclosure may further provide a method of manufacturing a track link. The track link may be suitable to be fixed to a track shoe having through holes with bolts and nuts. The method may include forming a link material. The link material may include two connecting holes separated by a predetermined distance in the link pitch direction, each suitable for receiving a link connecting member, a first surface on which one of the nuts is to be placed, a second surface on which another nut is to be placed, first projecting portions as a pair, each projecting from the first surface, facing each other in the link pitch direction, and apart from each other by a first distance which is greater than a width of the nut which is to be placed between the first projecting portions so that one of the first projecting portions engages with the nut that is to be placed between the first projecting portions but the other of the first projecting portions does not, and second projecting portions as a pair, each projecting from the second surface, facing each other in the link pitch direction, and apart from each other by a second distance which is equal to or greater than a width of the nut which is to be placed between the second projecting portions so that one of the second projecting portions engages with the nut that is to be placed between the second projecting portions but the other of the second projecting portions does not, or both of the second projecting portions engage with the nut. The method may further include forming a first through hole which extends orthogonal to the connecting holes and is configured to receive one of the bolts, at a corresponding position to one of the through holes of the track shoe, and forming a second through hole which extends orthogonal to the connecting holes and is configured to receive another bolt, at a corresponding position to another through hole of the track shoe.

In a preferred arrangement, the step of forming the second projecting portions may include forming the second projecting portions apart from each other by the second distance which is greater than the width of the nut which is to be placed between the second projecting portions.

In a preferred arrangement, the step of forming the first through hole may include forming the first though hole being circular in a cross section, and having a center shifted from a middle position of the first projecting portions in the link pitch direction.

In an alternative, the step of forming the first through hole may include forming the first through hole being an oval shape in a cross section.

In a preferred arrangement, the step of forming the second through hole may include forming the second though hole being circular in a cross section, and having a center shifted from a middle position of the second projecting portions in the link pitch direction.

In an alternative, the step of forming the second through hole may include forming the second through hole being an oval shape in a cross section.

In a preferred arrangement, the method may further include forming a first opening between the two connecting holes, an inner wall surface of the first opening defining the first surface and the first projecting portions, and/or forming a second opening between the two connecting holes, an inner wall surface of the second opening defining the second surface and the second projecting portions.

In a preferred arrangement, the method may further include applying at least one of markers on a side surface of the link material, the markers indicating two alternative drilling positions for forming the first through hole and/or the second through hole.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Figure 1:
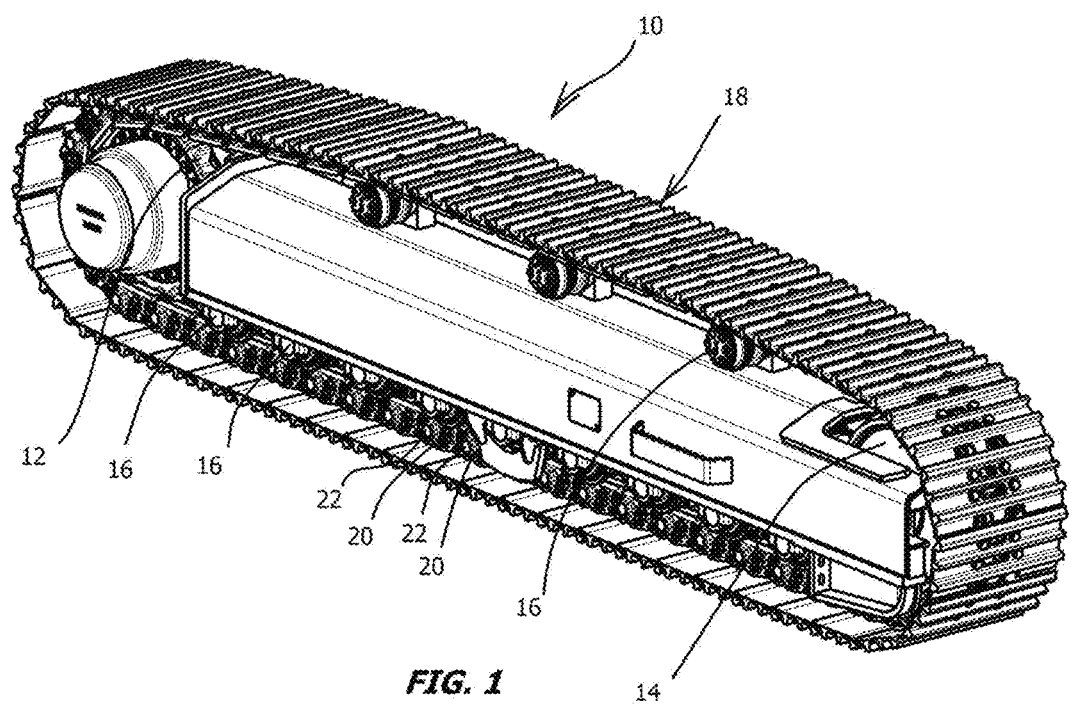
FIG. 1 is a perspective view of an endless track.

FIG. 1 illustrates an endless track 10 of a tracked vehicle. The endless track 10 is driven by a power source (not shown). The tracked vehicle may be any type of machine that performs an operation associated with an industry such as mining, excavation, construction, farming, or any other industry. For example, the tracked vehicle may be an earth-moving machine such as a drag shovel, a bulldozer, a loader, an excavator, or the like. The tracked vehicle is not limited to the earth-moving machine. The tracked vehicle may be any machine that includes a track, such as a cold planar, a tractor, a harvester, or the like.

The power source may drive the endless track 10 at a range of output speeds or torque.

The power source may be one or more fuel engine such as, for example, a diesel engine, a gasoline engine, or the like. In an alternative, the power source may be one or more electric motor powered from a fuel cell, a power storage device, or the like. Thus, the power source is not limited to any particular type of power source. The power source may be entirely omitted from the tracked vehicle, for example, when the vehicle is a trailer which is pulled by another vehicle.

A sprocket wheel 12 may be disposed on each endless track 10. The sprocket wheel 12 may be rotationally-driven by the power source. The sprocket wheel 12 may not be driven when the tracked vehicle is a trailer which is pulled by another vehicle.

An idler wheel 14 may be disposed on each endless track 10. The idler wheel 14 is spaced apart from the sprocket wheel 12. The idler wheel 14 locates at the opposite end of the endless track 10.

One or more guide pulleys 16 may be provided between the sprocket wheel 12 and the idler wheel 14.

The endless track 10 may include a track assembly 18 of one embodiment. The track assembly 18 may include a plurality of track links 20 of one embodiment, which are connected to one another with link connecting members 22. The track assembly 18 may also include a plurality of track shoes 24, which are configured to engage with a ground surface under the tracked vehicle, and are connected to the track links 20. The track assembly 20 may form a closed loop, and the closed loop may be supported by the sprocket wheel 12, the idler wheel 14, and the guide pulleys 16. In the illustrated arrangement, the sprocket wheel 12 is rotated by the power source and may engage and transmit torque to the track links 20 sequentially, resulting in the rotational movement of the looped shoes 24 around two wheels 12, 14 and the guide pulleys 16.

Figure 2:
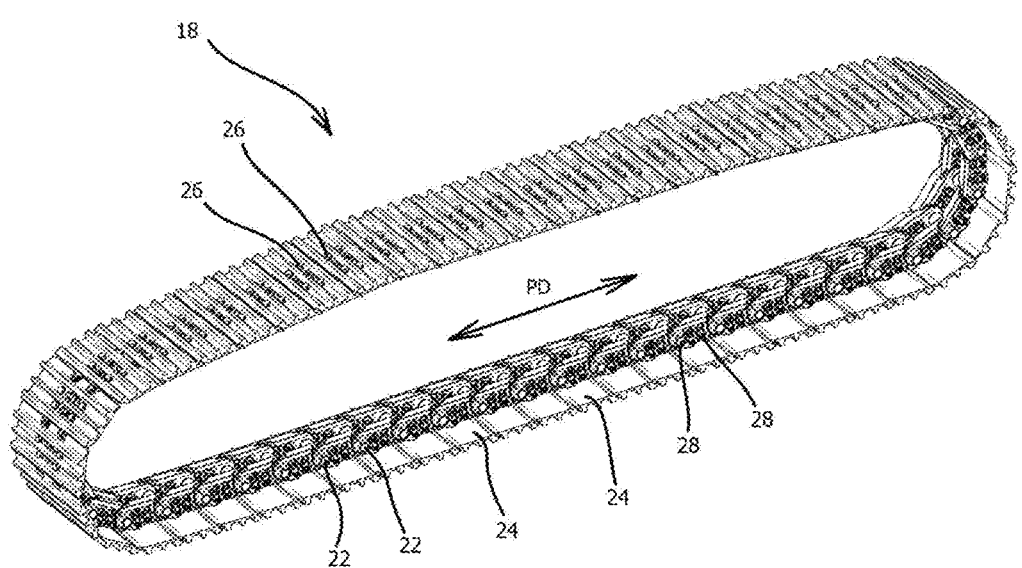
FIG. 2 is a perspective view of the track assembly.

FIG. 2 illustrates the track assembly 18 which includes the plurality of track links 20, link connecting members 22, sets of bolt 26 and nut 28, and the plurality of track shoes 24.

Figure 3:
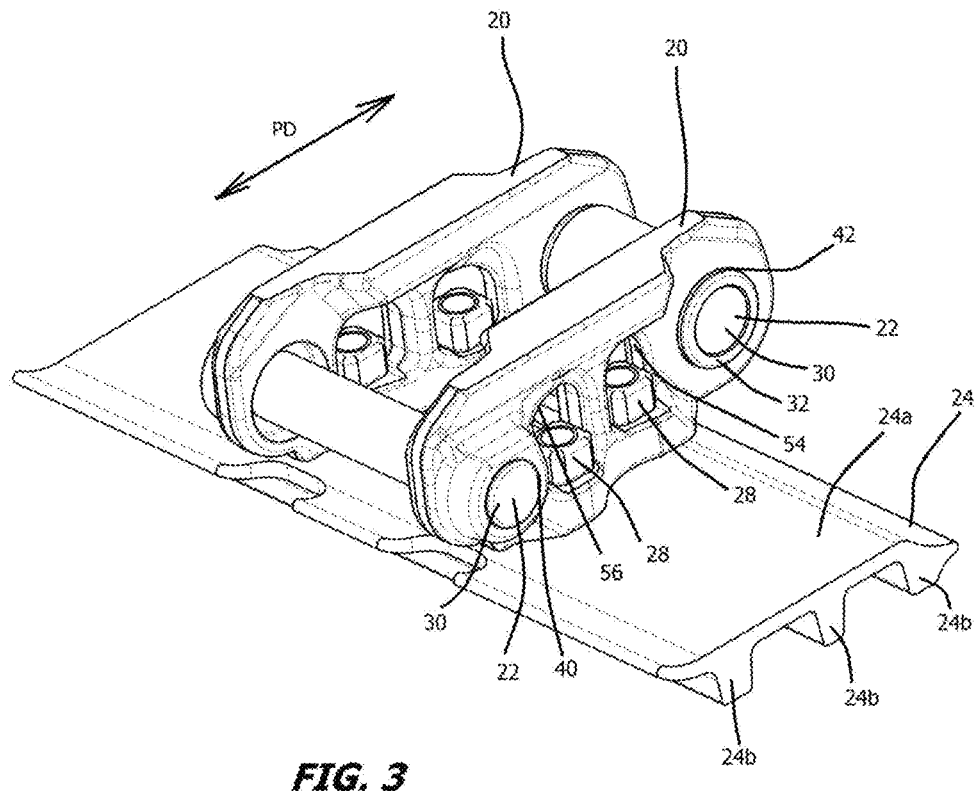
FIG. 3 is a perspective view showing an enlarged part of the track assembly of FIG. 2.
Figure 4:
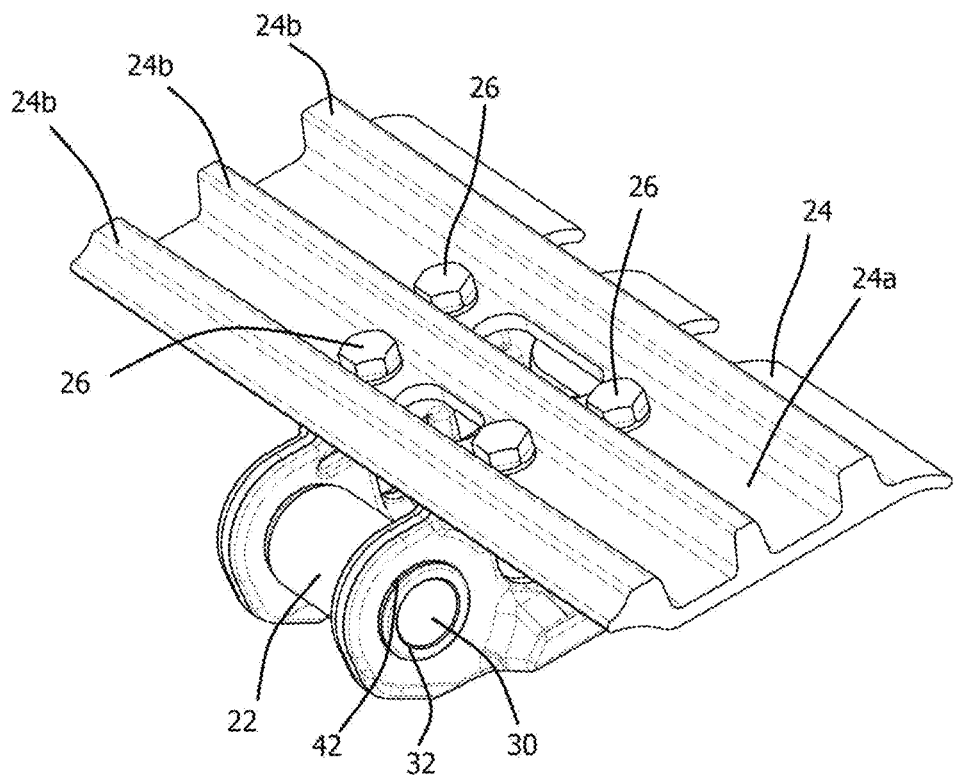
FIG. 4 is a perspective view showing the part of the different surface of FIG. 3.

FIG. 3 illustrates a part of the track assembly 18 shown in FIG. 2. A pair of track links 20 are shown in FIG. 3. FIG. 4 illustrates a different plane of the same part shown in FIG. 3. As shown in FIGS. 3 and 4, the pair of track links 20 may be mirror images of each other. One of the track links 20 may be disposed one side, that is right or left side of the track assembly 18, and the other of the track links 20 may be disposed the other side, that is left or right side of the track assembly 18.

Each connecting member 22 may include a track pin 30 and a bushing 32. The bushing 32 may have a cylindrical shape and be disposed on the track pin 30, such that the bushing 32 rotates relative to the track pin 30. By this arrangement, the sprocket wheel 12 may engage the bushing 32, and the bushing 32 may rotate on the track pin 30 with the sprocket wheel 12. As a result of the force applied to the bushing 32, the track pin 30 may travel, resulting in movement of the track assembly 18 around the sprocket wheel 12, the idler wheel 14 and the guide pulleys 16 (FIG. 1), as described above, to move the tracked vehicle on the ground surface.

Each track shoe 24 may include a substantially rectangular planar base 24a forming a ground-engaging surface. The track shoe 24 may also include one or more grousers (ground gripping protrusions) 24b extending in the lateral direction of the planar base 24a. The grouser 24b may increase the traction of track assembly 18 on the ground surface. Although FIGS. 3 and 4 show the track shoe 24 including three grousers 24b, the number of the grouser 24b is not limited to three. For example, each track shoe 24 may include one, two or three grousers 24b, or more than three grousers 24b. Further, although FIGS. 3 and 4 shows the grouser 24b in the shape of a bar with a rectangular cross section, the grouser 24b is not limited to this shape. For example, the grouser 24b may be divided into a plurality of bars, one or more spikes, one or more curves, or combinations of these or different shapes.

The track shoe 24 and the track link 20 are tightened together with two or more sets of threaded fasteners such as bolts 26 and nuts 28. The bolts 26 may be disposed within through holes (not shown) formed in the track shoe 24 and through holes 36, 38 (not visible in FIGS. 3 and 4) formed in the track link 20. Although FIGS. 3 and 4 show the track shoe 24 and the track link 20 being tightened together with two sets of the bolt 26 and nut 28, the number of sets of the bolt 26 and nut 28 is not limited to two. For example, the track shoe 24 and the track link 20 may be tightened together with more than two sets of the bolt 26 and nut 28, such as with three sets of the bolt 26 and nut 28. In this case, the track shoe 24 and the track link 20 may include three through holes for receiving the bolts, respectively.

Figure 5:
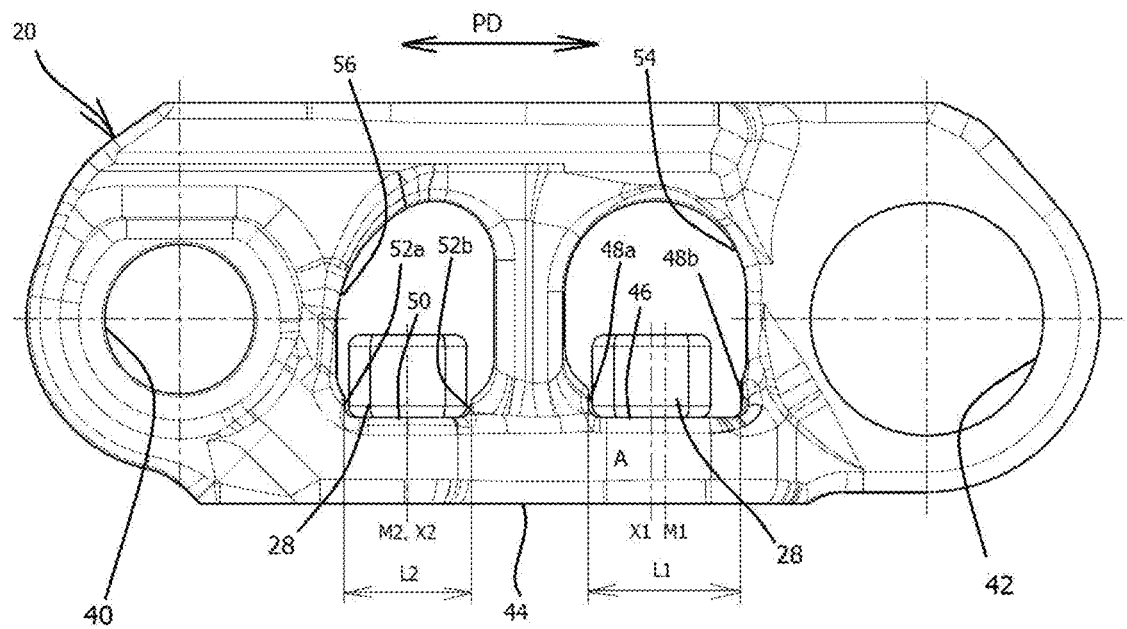
FIG. 5 is a side view of the track link of one embodiment.
Figure 6:
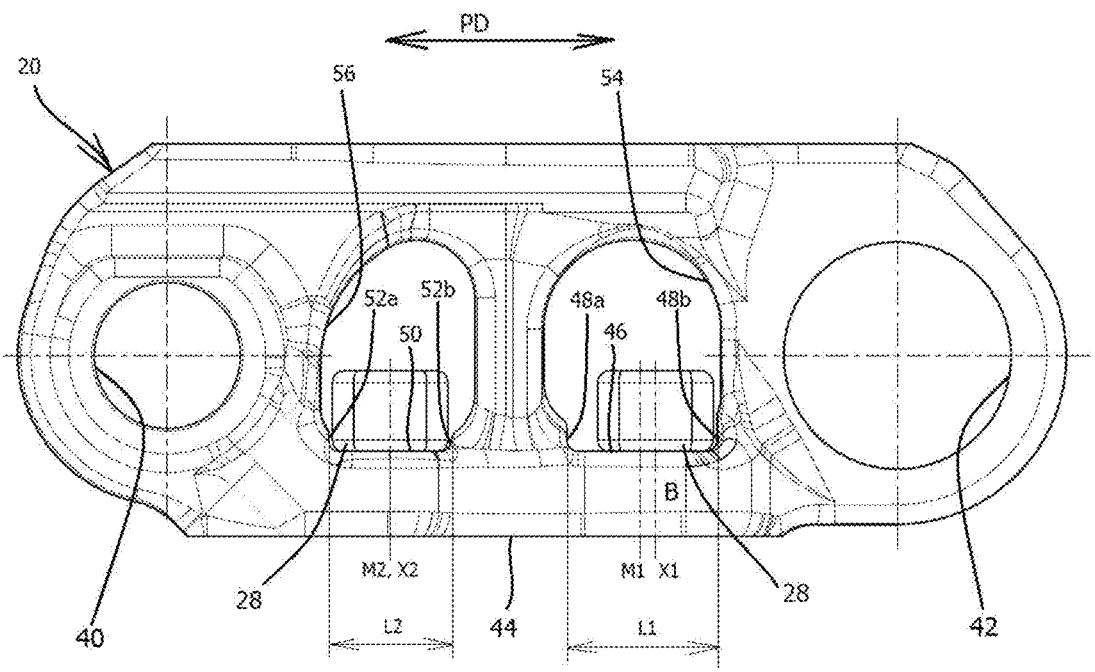
FIG. 6 is a side view of a track link based on the same concept as the track link of FIG. 5.

FIG. 5 shows a side view of a track link 20 in one embodiment of the present invention, which is suitably applied to the track assembly 18 described above. FIG. 6 shows a side view of a track link 20 according to the same concept as the track link 20 as shown in FIG. 5. The most advantageous point in these track links 20 is that, although the track link 20 shown in FIG. 5 and the track link shown 20 in FIG. 6 have different pitches of the through holes 36, 38 each other, they may be manufactured starting from the same track link material or semi-finished track link, and the through holes 36, 38 with different pitches may be formed at the end of the manufacturing process to correspond to the pitch of the through holes of the track shoe 24.

As shown in FIGS. 5 and 6, the track link 20 may include two connecting holes 40, 42. One of the connecting holes 42 may be for receiving the bushing 32; the other of the connecting holes 40 may be for receiving the track pin 30. The two connecting holes 40, 42 are spaced from each other by a predetermined distance in a link pitch direction PD. The connecting holes 40, 42 penetrates the track link 20 in the lateral direction. In other words, the connecting holes 40, 42 extend between both sides of the track link 20.

The track link 20 may include two or more through holes 36, 38 (FIG. 7) for receiving the bolts 26. In the illustrated example, two through holes, that is, a first through hole 36 and a second through hole 38 are formed between the connecting holes 40, 42. The first and second through holes 36, 38 may extend orthogonal to the connecting holes 40, 42. Each through hole 36, 38 may open to a shoe attachment surface 44. The first through hole 36 of the track link 20 may correspond to one of the through holes formed in the track shoe 24. The second through hole 38 of the track link 20 may correspond to another or the other of the through holes formed in the track shoe 24.

The track link 20 may include a first surface 46 in which the first through hole 36 opens on the side opposite the shoe attachment surface 44 and on which the nut 28 is to be placed. The first surface 46 may function as a seat for the nut 28. The first surface 46 may be a flat surface.

The track link 20 may include first projecting portions 48a, 48b as a pair, each projecting from the first surface 46 and facing each other in the link pitch direction PD across the first through hole 36. Each first projecting portion 48a, 48b may be a flat surface which extends in the extending direction of the first through hole 36 and the extending direction of the connecting holes 40, 42.

The first projecting portions 48a, 48b may be spaced apart from each other by a first distance L1 through which one of the first projecting portions 48a, 48b is to be engaged with the nut 28 that is to be placed between the first projecting portions 48a, 48b, but the other of the first projecting portions 48a, 48b is not to be engaged with this nut 28. By this arrangement, one of the first projecting portions 48a, 48b is configured to selectively engage with the nut 28, resulting in a prevention of the rotation of the nut 28. Thereby, the first through hole 36 may be formed to locate at either one of two positions A and B, depending on the position of the corresponding through hole of the track shoe 24 while obtaining the rotation prevention function of the nut 28. Markers on at least one side surface of the track link 20 indicate the positions A and B. This may allow the standardization of track link material.

The track link 20 may include a second surface 50 in which the second through hole 38 opens on the side opposite the shoe attachment surface 44 and on which the nut 28 is to be placed. The second surface 50 may function as a seat for the nut 28. The second surface 50 may be a flat surface.

The track link 20 may include second projecting portions 52a, 52b as a pair, each projecting from the second surface 50 and facing each other in the link pitch direction PD across the second through hole 38. Each second projecting portion 52a, 52b may be a flat surface which extends in the extending direction of the second through hole 38 and the extending direction of the connecting holes 40, 42. The second projecting portions 52a, 52b may be spaced apart from each other by a second distance L2 through which one of the second projecting portions 52a, 52b is to be engaged with the nut 28 which is to be placed between the second projecting portions 52a, 52b, but the other of the second projecting portions 52a, 52b is not to be engaged with this nut 28. In an alternative, the second projecting portions 52a, 52b may be spaced apart from each other by a second distance L2 through which both of the second projecting portions 52a, 52b are to be engaged with the nut 28 therebetween. By either arrangement, at least one of the second projections 52a or 52b is configured to engage with the nut 28, resulting in a prevention of the rotation of the nut 28, while the pitch of the first and second through holes 36, 38 is changeable since at least the first through hole 36 can locate at either one of the position A and B. In the illustrated example, both of the second projecting portions 52a, 52b are configured to engage with the nut 28 which is placed between the second projecting portions 52a, 52b.

In the illustrated example, there are two through holes 36, 38 and one of them is configured to be position changeable, but the present invention is not limited thereto. For example, when the number of through hole is "N" and the number of position changeable through hole is "M" (N and M are integers), M<=N may be satisfied.

The track link 20 may include one or more openings 54, 56 aligned with the through holes 36, 38. The openings 54, 56 may penetrate the track link 20 in the lateral direction. In other words, the openings 54, 56 may extend between both sides of the track link 20, along the connecting holes 40, 42. Each opening 54, 56 may accommodate the nut 28. In the illustrated example, two openings 54, 56 are formed in the track link 20, but the number of the openings 54, 56 are not limited to two. The number of the opening for accommodating the nut 28 may be independent from the number of the through hole 36, 38. The number of the opening for accommodating the nut 28 may be one, or more than two such as three. One opening may be configured to accommodate two or more nuts 28 simultaneously (not shown). In the illustrated example, one opening 54 aligned with the first through hole 36 may be referred to as "first opening"; the other opening 56 aligned with the second through hole 38 may be referred to as "second opening".

The first opening 54 may define the first surface 46 and the first projecting portions 48a, 48b. In other words, the first surface 46 and the first projecting portions 48a, 48b are formed with an inner wall surface of the first opening 54. By this arrangement, a compact track link 20 can be provided because the first surface 46 and the first projecting portions 48a, 48b do not overhang laterally.

Likewise, the second opening 56 may define the second surface 50 and the second projecting portions 52a, 52b. In other words, the second surface 50 and the second projecting portions 52a, 52b are formed with an inner wall surface of the second opening 56. By this arrangement, a compact track link 20 can be provided because the second surface 50 and the second projecting portions 52a, 52b do not overhang laterally.

In a case where only one opening is provided and this opening is configured to accommodate two nuts 28, the first and second surfaces 46, 56 and the first and second projecting portions 48a, 48b, 52a, 52b may be defined by an inner wall surface of the single opening.

In another example, the first opening 54 and/or second opening 56 may be omitted. In this arrangement, one or more flanges (not shown) may be provided. The flange may extend laterally from the side of the track link 20. The surface of the flange facing the shoe 24 may be the same plane as the shoe attachment surface 44. The first through hole 36 may be formed in the flange. The first projecting portions 48a, 48b may be formed on the surface of the flange opposite to the shoe attachment surface 44. The second through hole 38 may be formed in the flange. The second projecting portions 52a, 52b may be formed on the surface of the flange opposite to the shoe attachment surface 44.

Figure 7:
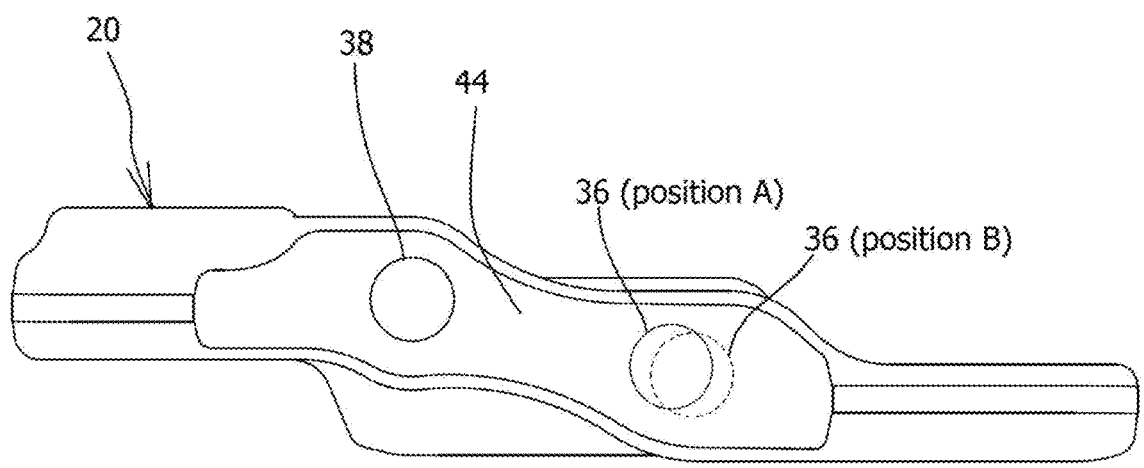
FIG. 7 is a plan view of the track link of FIG. 5 or FIG. 6.

FIG. 7 illustrates a plan view of the track link 20 shown in FIG. 5 or FIG. 6. In this figure, the first through hole 36 and the second through hole 38 are well identified. The first through hole 36 indicated by the solid line indicates the position A of the first through hole 36 formed in the track link of FIG. 5; the first through hole 36 indicated by the broken line indicates the position B of the first through hole 36 formed in the track link of FIG. 6. It can also be understood from this figure that, starting from the same track link material or semi-finished track link, at least two track links 20 with different through hole pitches can be provided. It is possible to use a common line to manufacture several types of track links 20 with different through hole pitches. It should be noted that, in the example shown in FIG. 7, only the first through hole 36 is selectively formed in either of two positions A and B, but the second through hole 38 may also be selectively formed in either of two positions C and D (not shown). In this case, corresponding to the pitch of the through holes of the track shoe 24, one of four different pitches can be selected from the combination of the positions of the first and second through holes 36, 38, that is, A-C, A-D, B-C and B-D.

The first through hole 36 may be circular in a cross section, as shown in FIG. 7. In this arrangement, the first through hole 36 may be formed such that a center X1 of the first through hole 36 is shifted from a middle position M1 of the first projecting portions 48a, 48b in the link pitch direction PD (FIGS. 5 and 6). The diameter of the first through hole 36 may be such that the bolt 26 disposed in the first through hole 36 does not freely move to keep the engagement between the one of the first projecting portions 48a, 48b and the nut 28 therebetween.

The second through hole 38 may be circular in a cross section, as shown in FIG. 7. In this arrangement, the second through hole 38 may be formed such that a center X2 of the second through hole 38 is aligned with a middle position M2 of the second projecting portions 52a, 52b (FIGS. 5 and 6), or is shifted from the middle position M2 of the second projecting portions 52a, 52b in the link pitch direction PD (not show). The diameter of the second through hole 38 may be such that the bolt 26 disposed in the second through hole 38 does not freely move to keep the engagement between at least one of the second projecting portions 52a, 52b and the nut 28 therebetween.

In an alternative, the first through hole 36 may have an oval shape in a cross section (not shown). The oval shape may include both of the position A and B. By this arrangement, it is more advantageous in the standardization of the track link material because the single first through hole 36 with the oval shape is applicable to the different pitches of the through holes of the track shoe 24. The oval shaped first through hole 36 can naturally correspond to both the position A and the position B. It is preferable that an undesired movement of the bolt 26 in the first through hole 36 with the oval shape may be prevented by the corresponding circular through hole of the track shoe 24, and/or an additional insert (not shown) being inserted into the first through hole 36. The additional insert may fill the gap between the first through hole 36 with oval shape and the bolt 26.

Likewise, the second through hole 38 may have an oval shape in a cross section (not shown). By this arrangement, it is more advantageous in the standardization of the track link material because the single second through hole 38 with the oval shape is applicable to the different pitches of the through holes of the track shoe 24. The oval shape second through hole 38 can naturally correspond to both the position C and the position D. It is preferable that an undesired movement of the bolt 26 in the second through hole 38 with the oval shape may be prevented by the corresponding circular through hole of the track shoe 24, and/or an additional insert (not shown) being inserted into the second through hole 38. The additional insert may fill the gap between the second through hole 38 with oval shape and the bolt 26.

Figure 8:
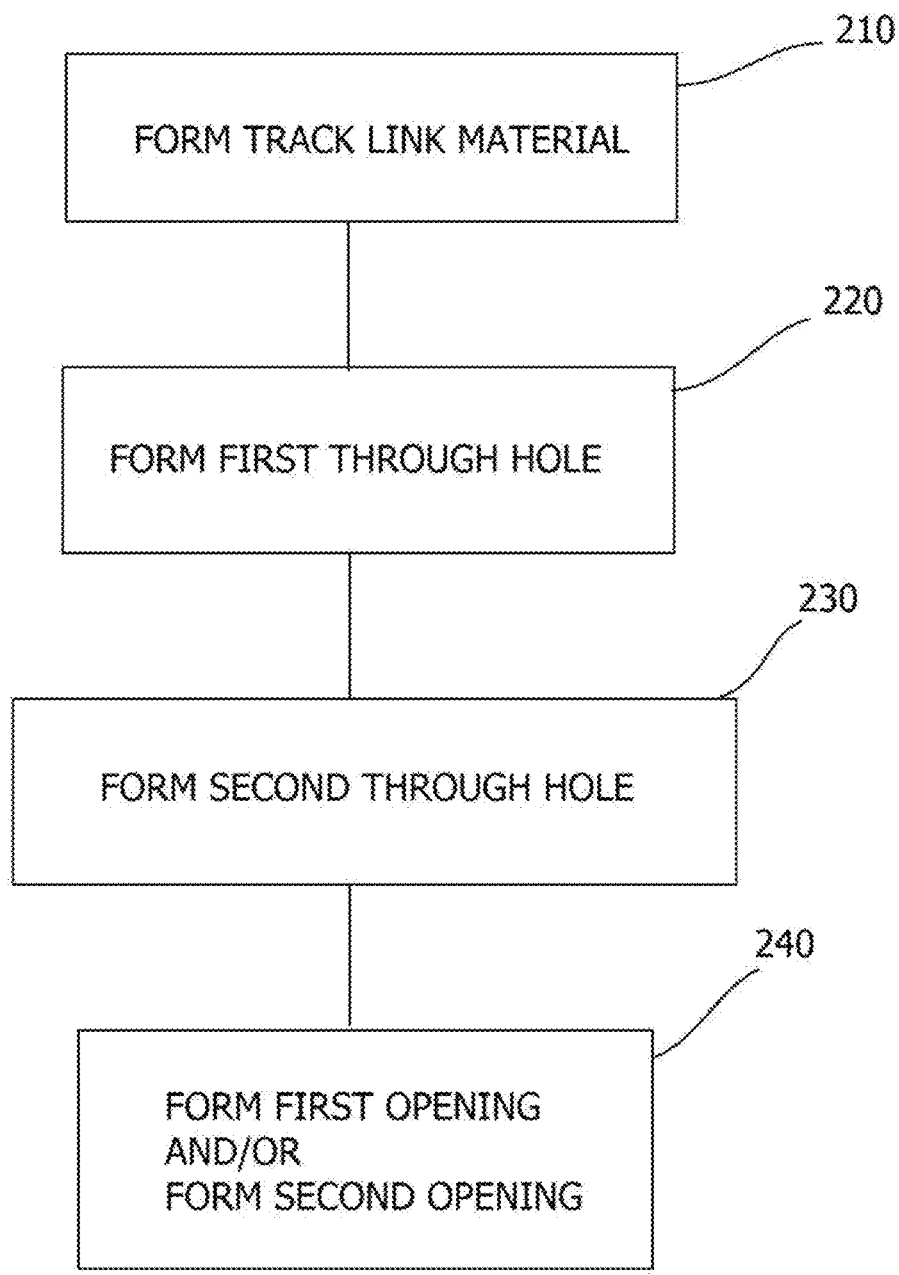
FIG. 8 is a flow chart showing a manufacturing method of a track link, of one embodiment.

The following discussion, with reference to FIG. 8, provides an exemplary process for manufacturing a track link. Duplicate descriptions are omitted by referring to the same reference numerals indicated in FIGS. 1 to 7.

As shown in Step 210, a track link material may be formed. The track link material may be made of carbon steel or carbon alloy steel. The track link material may be made through known machining such as forging, pressing, drilling and/or cutting, and heat treatments if necessary. The track link material may includes: two connecting holes 40, 42 separated by a predetermined distance in the link pitch direction PD, each suitable for receiving a link connecting member 22; a first surface 46 on which one of the nuts 28 is to be placed; a second surface 50 on which another or the other nut 28 is to be placed; first projecting portions 48a, 48b as a pair, each projecting from the first surface 46, facing each other in the link pitch direction PD, and apart from each other by a first distance L1 which is greater than a width of the nut 28 which is to be placed between the first projecting portions 48a, 48b; and second projecting portions 52a, 52b as a pair, each projecting from the second surface 50, facing each other in the link pitch direction PD, and apart from each other by a second distance L2 which is equal to or greater than a width of the nut 28 which is to be placed between the second projecting portions 52a, 52b.

At least one of markers may be applied to a side surface of the link material, the markers indicating two alternative drilling positions A and B for forming the first through hole 36 and/or the second through hole 38.

As shown in Step 220, a first through hole 36 may be formed at a corresponding position to the through hole of the track shoe 24. The first through hole 36 may be formed by machining such as drilling. If the pitch of the through holes of the track shoe 24 is relatively large, the first through hole 36 may be formed at the position B (FIG. 6). Conversely, if the pitch of the through holes of the track shoe 24 is relatively small, the first through hole 36 may be formed at the position A (FIG. 5). Therefore, one track link material may be applicable to different track shoes 24 having different through hole pitches.

As shown in Step 230, a second through hole 38 may be formed at a corresponding position to the through hole of the track shoe 24. The second through hole 38 may be formed by machining such as drilling. The second through hole 38 may be formed simultaneously with the first through hole 36, or may be formed before or after the first through hole 36 formed.

It should be understood that the term "track link material" does not include the first and second through holes 36, 38, for the reason of convenience to identify the invention, but in the actual production site these through holes 36, 38 may be formed within the step of forming the link material. That is, the first and second through holes 36, 38 may be formed before or after forming the connecting holes 40, 42, the first and second surfaces 46, 50, and the first and second projecting portions 48a, 48b, 52a, 52b, or at the same time.

The Step 210 may include forming the second projecting portions 52a, 52b apart from each other by a second distance L2 which is greater than a width of the nut 28 that is to be placed between the second projecting portions 52a, 52b. In this arrangement, one of the second projecting portions 52a or 52b may engage with the nut 28 but the other 52b or 52a does not.

The Step 220 may include forming the first though hole 36 being circular in a cross section, and having a center X1 shifted from a middle position M1 of the first projecting portions 48a, 48b in the link pitch direction PD.

The Step 220 may include forming the first through hole 36 being an oval shape in a cross section.

The Step 230 may include forming the second though hole 38 being circular in a cross section, and having a center X2 shifted from a middle position M2 of the second projecting portions 52a, 52b in the link pitch direction PD.

The Step 230 may include forming the second through hole 38 being an oval shape in a cross section.

The method may further include Step 240 of forming a first opening 54 between the two connecting holes 40, 42, of which an inner wall surface defines the first surface 46 and the first projecting portions 48a, 48b, and/or forming a second opening 56 between the two connecting holes 40,42, of which an inner wall surface defines the second surface 50 and the second projecting portions 52a, 52b.

LIST OF REFERENCE SIGNS 10 tracked vehicle
12 sprocket wheel
14 idler wheel
16 guide pulleys
18 track assembly
20 track link
22 link connecting member
24 track shoe
26 bolt
28 nut
30 track pin
32 bushing
36 first through hole
38 second through hole
40 connecting hole
42 connecting hole
44 shoe attachment surface
46 first surface
48a, 48b first projection portions
50 second surface
52a, 52b second projecting portions
54 first opening
56 second opening
L1 first distance
L2 second distance
X1 center of the first through hole
X2 center of the second through hole
M1 middle position of first projecting portions
M2 middle position of second projecting portions

What is claimed is:

1. A track link that is configured to be fixed to a track shoe with nuts and bolts, the track link comprising:
    two connecting holes that are spaced apart by a predetermined distance in a link pitch direction and are configured, respectively, to receive a link connection member;
    a first through hole that extends orthogonally to the two connecting holes and is configured to receive a first of the bolts;
    a first surface in which the first through hole opens and on which a first of the nuts is positionable;
    a second through hole that extends orthogonally to one of the connecting holes and is configured to receive a second of the bolts;
    a second surface in which the second through hole opens and on which a second of the nuts is positionable;
    first projecting portions as a pair, wherein the first projecting portions project from the first surface and face each other in the link pitch direction across the first through hole; and
    second projecting portions as a pair, wherein the second projecting portions project from the second surface and face each other in the link pitch direction across the second through hole,
    wherein the first projecting portions are spaced apart from each other by a first distance and only one of the first projecting portions is configured to engage with the first nut that is positionable between the first projecting portions,
    wherein the second projecting portions are spaced apart from each other by a second distance and at least one of the second projecting portions is configured to engage with the second nut that is positionable between the second projecting portions.

2. The track link of claim 1 wherein the first through hole is circular in cross section and has a center that is offset relative to a middle position between the first projecting portions in the link pitch direction.

3. The track link of claim 1 wherein a cross section of the first through hole is oval-shaped.

4. The track link of claim 1 wherein the second through hole is circular in cross section and has a center that is offset relative to a middle position between the second projecting portions in the link pitch direction.

5. The track link of claim 1 wherein a cross section of the second through hole is oval-shaped.

6. The track link of claim 1 comprising a first opening between the two connecting holes, wherein an inner wall surface of the first opening defines the first surface and the first projecting portions.

7. The track link of claim 6 comprising a second opening between the two connecting holes, wherein an inner wall surface of the second opening defines the second surface and the second projecting portions.

8. The track link of claim 1 comprising an opening between the two connecting holes, wherein an inner wall surface of the opening defines the second surface and the second projecting portions.

9. The track link of claim 1 wherein the first distance is greater than a width of the first nut.

10. The track link of claim 1 wherein the second distance is greater than a width of the second nut.

11. A track assembly comprising:
    track links, wherein each of the track links is according to the track link recited in claim 1;
    link connection members for connecting the track links;
    track shoes, each track shoe having through holes;
    bolts that are placed within the through holes of the track shoes and the first and second through holes of the track links; and
    nuts, each nut being fastened on an end of one of the bolts,
    wherein the nut disposed between the first projecting portions of each track link engages only one of the first projecting portions,
    wherein the nut disposed between the second projecting portions of each track link engages at least one of the second projecting portions.

12. A method of manufacturing a track link configured to be fixed with nuts and bolts to a track shoe having through holes, the method comprising:
    forming a link material that includes:
        two connecting holes separated by a predetermined distance in a link pitch direction, with each of the two connecting holes being configured to receive a link connecting member,
        a first surface on which a first of the nuts is configured to be positioned,
        a second surface on which a second of the nuts is configured to be positioned,
        first projecting portions as a pair, the first projecting portions projecting from the first surface and facing each other in the link pitch direction, wherein the first projecting portions are spaced apart by a first distance that is greater than a width of the first nut that is positionable between the first projecting portions such that only one of the first projecting portions is configured to engage the first nut, and second projecting portions as a pair, the second projecting portions projecting from the second surface and facing each other in the link pitch direction, wherein the second projecting portions are spaced apart by a second distance that is equal to or greater than a width of the second nut that is positionable between the second projecting portions such that at least one of the second projection portions is configured to engage the second nut;

forming a first through hole that extends orthogonally to the two connecting holes and is configured to receive a first of the bolts at a position that corresponds to a first of the through holes of the track shoe; and forming a second through hole that extends orthogonally to the two connecting holes and is configured to receive a second of the bolts at a position that corresponds to a second of the through holes of the track shoe.

13. The method of claim 12 wherein forming the link material with the second projecting portions comprises forming the second projecting portions such that the second distance is greater than the width of the second nut.

14. The method of claim 12 comprising one of:

forming the link material with the first through hole comprises forming the first through hole with a circular cross section and with a center that is offset relative to a middle position between the first projecting portions in the link pitch direction; or forming the first through hole with an oval-shaped cross section.

15. The method of claim 12 comprising one of:

forming the link material with the second through hole comprises forming the second through hole with a circular cross section and with a center that is offset relative to a middle position between the second projecting portions in the link pitch direction; or forming the second through hole with an oval-shaped cross section.

16. The method of claim 12 comprising at least one of:

forming a first opening between the two connecting holes, wherein an inner wall surface of the first opening defines the first surface and the first projecting portions; or forming a second opening between the two connecting holes, wherein an inner wall surface of the second opening defines the second surface and the second projecting portions.

17. The method of claim 12 comprising applying markers on a side surface of the link material, the markers indicating two alternative drilling positions for forming the first through hole and/or the second through hole.

* * * * *